Figure 1:
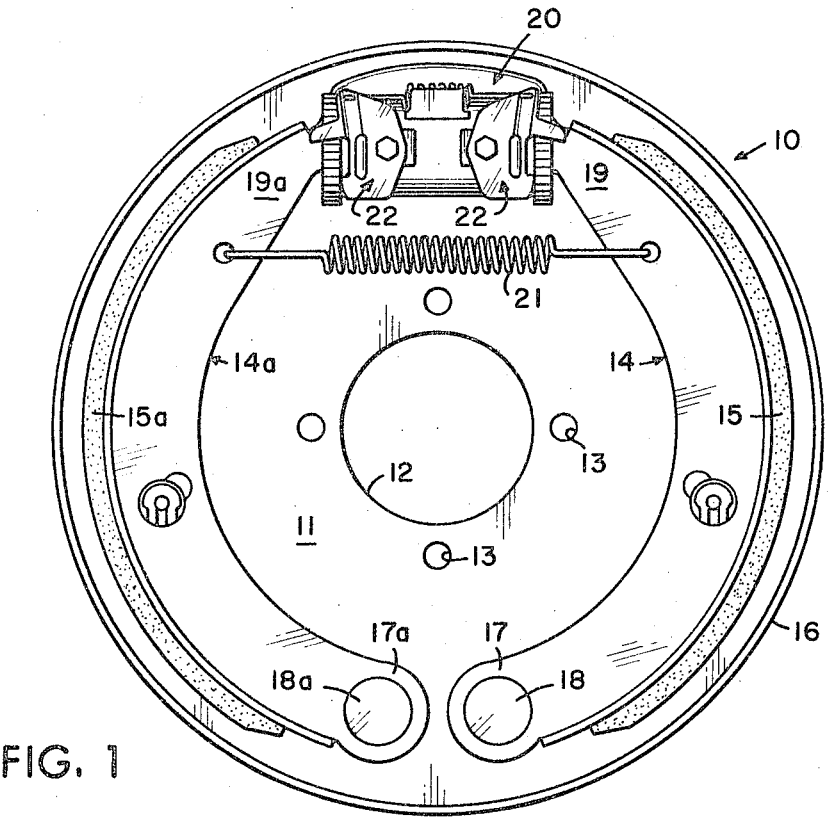

June 20, 1967  E. E. WALLACE  3,326,331
AUTOMATIC ADJUSTOR MECHANISM
Filed Jan. 27, 1965  3 Sheets-Sheet 1

INVENTOR
EUGENE E. WALLACE
BY
Gravely, Lieder & Woodruff
ATTORNEYS

INVENTOR
EUGENE E. WALLACE
BY
Gravely, Lieder & Woodruff
ATTORNEYS

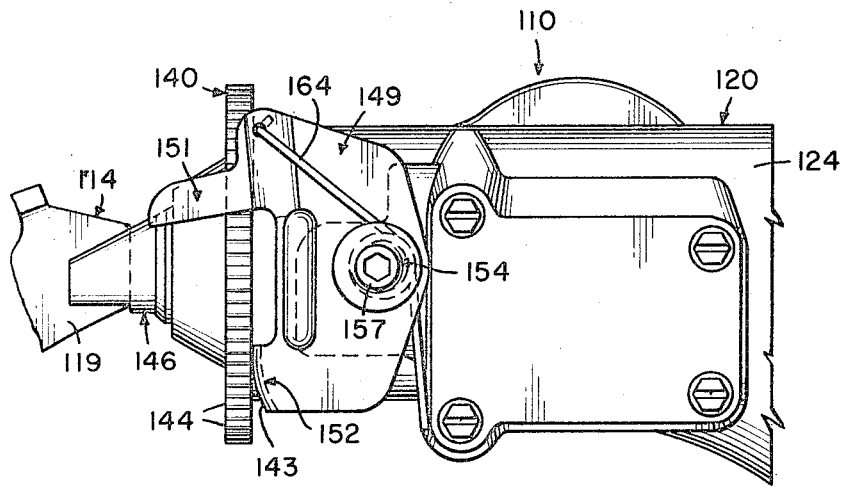

United States Patent Office 3,326,331
Patented June 20, 1967

3,326,331
AUTOMATIC ADJUSTOR MECHANISM
Eugene E. Wallace, Kirkwood, Mo., assignor to Wagner Electric Corporation, St. Louis, Mo., a corporation of Delaware
Filed Jan. 27, 1965, Ser. No. 428,463
13 Claims. (Cl. 188—79.5)

This invention relates generally to friction devices, and more particularly to an automatic adjustor mechanism for relatively displaceable friction members.

Automatic adjustor mechanisms are utilized in friction devices to adjustably reposition the retracted position of a friction member with respect to a cooperating friction drum in order to maintain the relative displacement between these friction members substantially constant regardless of the wear of friction lining on the friction member occasioned by frictional engagement with the drum. Most adjustor mechanisms provide an extensible strut determining the retracted position of one friction member and the clearance or displacement thereof relative to the other friction member, a rotary member threadedly engaged with the strut to control extension thereof, and adjustor means arranged to rotate the rotary member and extend the strut to an adjusted retracted position when wear of the friction member exceeds a predetermined amount and the adjustor means also normally engaging the rotary member to prevent rotation thereof. To perform this dual function, some adjustors were biased by separate resilient means to maintain anti-rotational engagement of the adjustor from the rotary member upon predetermined displacement movement of the friction members preparatory for adjusting actuation of the rotary member. In some prior devices, special resilient means were required to provide the force necessary to rotate the rotary member.

Another problem of some prior adjustor mechanisms was to permit deflection or override of the adjustor relative to the rotary member in one direction, but to maintain a positive driving engagement there-between and preventing override in the adjusting direction. A separate, but related, problem of such adjustors was the difficulty in manually rotating the rotary member in the event of overadjustment or for installing new friction members or linings. In such mechanisms the spring load effecting engagement between the adjustor and rotary member was so strong that manual adjustment was extremely difficult, or it was necessary to deflect the adjustor out of engagement with the rotary member while the rotary member was being rotated to an unadjusted or released position, in some cases requiring two tools.

The principal object of the present invention it to provide an automatic adjustor mechanism which substantially overcomes the objectionable features of prior devices, and which is positive acting, accurate and reliable in performance.

Another object is to provide an adjustor mechanism for maintaining a predetermined amount of displacement movement between relatively rotatable friction members and for automatically and positively adjusting the displacement distance to said predetermined amount upon wear of a friction member.

Another object of the invention is to provide an adjustor of novel construction and operation, and being positively engaged with adjustable means for compensating for the wear of a friction member and maintaining an adjusted position thereof, yet disengageable from the adjustable means to a released, override condition for manually adjusting or unadjusting the adjustable means.

Another object is to provide an adjustor adapted for use in single or double actuators and employing single resilient biasing means.

Another object of the invention is to provide automatic adjustor means for use with actuators and friction devices of all types.

These and other objects and advantages will become more apparent hereinafter.

Briefly, the present invention is embodied in adjustable means for predetermining the retracted position of a friction member, including adjustor means swivelly positioned adjacent to the adjustable means and including a lever portion normally engaged with the adjustable means to control adjustment thereof, the adjustor means being displaceable in response to an external force exerted on the adjustable means to disengage the lever portion from the adjustable means and permit selective adjusting thereof.

Figure 2:
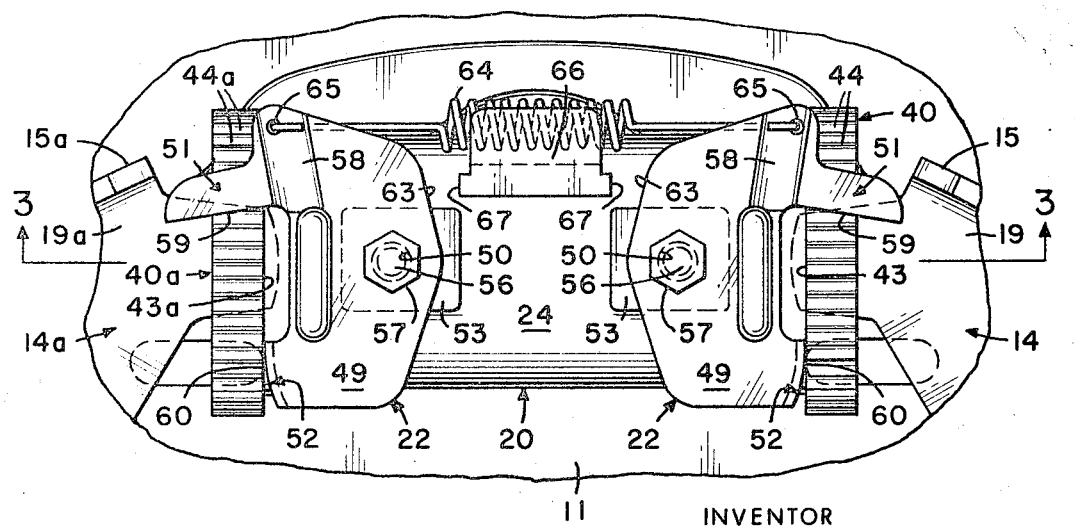
Figure 3:
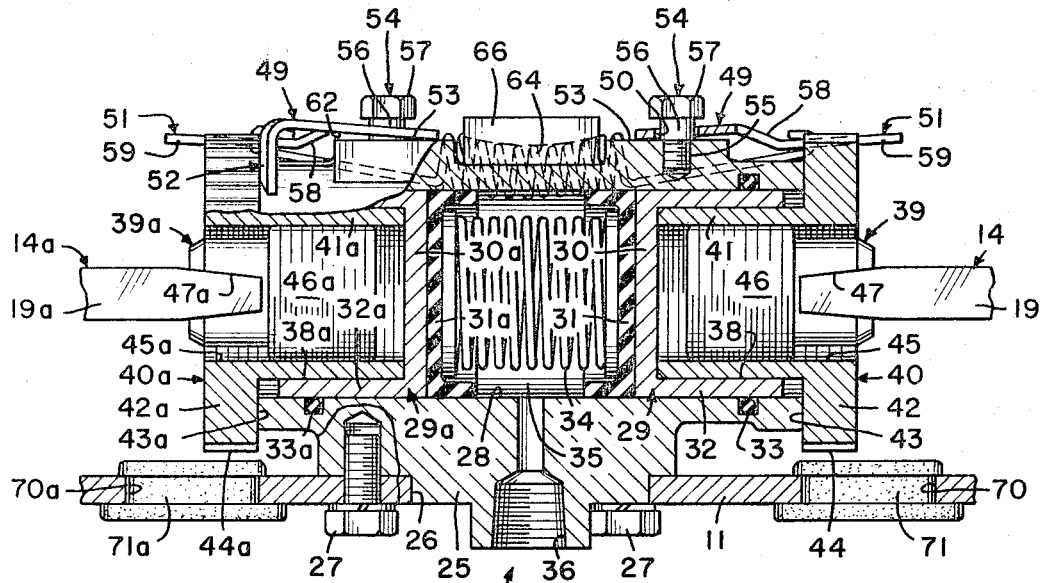
Figure 4:
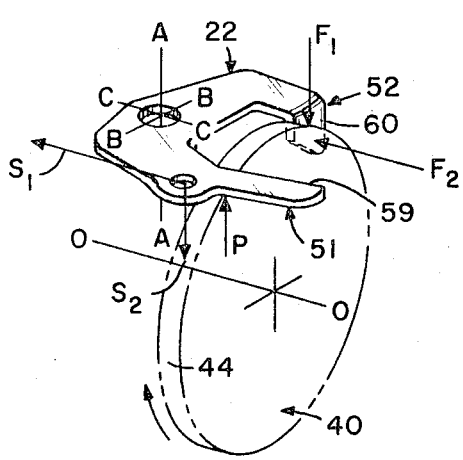
Figure 5:
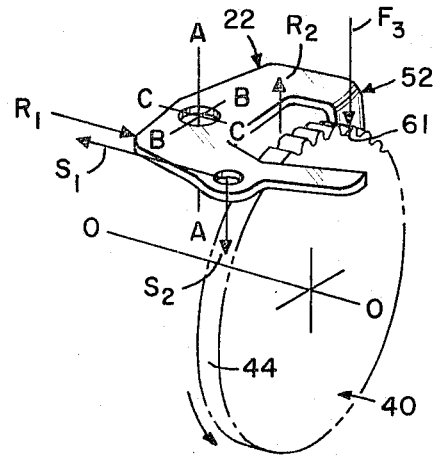

The invention is also embodied in the parts and in the arrangements and combinations of parts hereinafter described and claimed. In the accompanying drawings which form a part of this specification and wherein like numerals refer to like parts wherever they occur:

FIGURE 1 is an elevational view of a friction brake device including actuator means and adjustor means embodying the invention, FIGURE 2 is a greatly enlarged fragmentary view, similar to FIGURE 1, showing the actuator and adjustor means, FIGURE 3 is a cross-sectional view taken substantially along line 3—3 of FIGURE 2, FIGURE 4 is a diagrammatic illustration of the adjustor means in normal operating position, FIGURE 5 is a view similar to FIGURE 4 showing the adjustor means in released position, FIGURE 6 is an elevational view showing another form of the invention and friction brake device, and FIGURE 7 is a cross-sectional view of the embodiment shown in FIGURE 6.

Referring to FIGURE 1 of the drawings, a friction device or wheel brake assembly 10 includes a support or backing plate 11 having a central opening 12 and mounting apertures 13 for connection with a vehicle axle flange (not shown). A pair of friction members or brake shoes 14, 14a carry friction material or linings 15, 15a and are mounted on the backing plate 11 for relative outward displacement to engage the linings 15, 15a with a relatively rotatable friction member or brake drum 16. In the brake assembly 10 illustrated in FIGURE 1, the brake shoes 14, 14a having adjacent, relatively fixed anchoring ends 17, 17a pivotally mounted on spaced anchor members 18, 18a secured to the backing plate 11. The brake shoes 14, 14a also have adjacent, relatively displaceable ends 19, 19a positioned at opposite ends of an actuator motor or wheel cylinder 20, and a shoe return spring 21 is connected between the brake shoes 14, 14a and urges the adjacent ends 19, 19a into engagement with the actuator means 20. The actuator means 20 is provided with automatic adjustor means, indicated generally at 22, for maintaining a predetermined clearance between the friction lining 15, 15a of the brake shoes 14, 14a and the brake drum 16, as will be described in detail hereinafter.

Referring particularly to FIGURES 2 and 3, the wheel cylinder 20 includes a housing 24 cast with an integral mounting hub portion 25 which protrudes through an opening 26 in the backing plate 11, and a plurality of fastening means 27 secure the wheel cylinder 20 to the backing plate. The housing 24 is provided with a through bore 28 in which a pair of opposed cup-shaped pressure responsive actuator or piston members 29, 29a are slidably disposed. The piston members have base walls 30, 30a seating sealing cups 31, 31a and annular side walls 32, 32a slidable in the bore 28 and engaged with sealing rings 33, 33a at their outer ends. The piston members 29, 29a are axially spaced apart by a spring 34 to define a pressure fluid chamber 35 having an inlet port 36. The piston or actuator members 29, 29a define cylindrical chambers or bores, 38, 38a with which adjustment mechanisms 39, 39a are cooperable for actuating the brake shoes 14, 14a and adjusting the position thereof to compensate for wear of the lining 15, 15a.

The adjustment means 39, 39a includes first or starwheel members 40, 40a having axially extending sleeve portions 41, 41a rotatably and slidably positioned in the chambers 38, 38a against the side walls 32, 32a and having inner ends abutting the base walls 30, 30a of the actuator means 29, 29a. The members 39, 39a also have radially extending annular flanges 42, 42a formed with abutment surfaces or shoulders 43, 43a engaged against the ends of the wheel cylinder housing 24, and the circumferences of the annular flanges 42, 42a are grooved or notched to form axially extending teeth or serrations 44, 44a. The starwheel members 40, 40a have axial threaded bores 45, 45a which threadedly receive second or strut members 46, 46a, the strut members having shoe guide slots 47, 47a at the outer ends thereof in which the adjacent shoe ends 19, 19a are vertically slidable and retained against lateral displacement and the shoe ends preventing rotation of the struts 46, 46a. The compressive force of the shoe return spring 21 maintains the ends 19, 19a of the brake shoes 14, 14a engaged in the shoe guide slots 47, 47a and acts to bias the shoulders 43, 43a against the ends of the housing 24 to define the normally retracted position of the parts as shown in FIGURES 1, 2 and 3.

It will be apparent from the foregoing description that the friction brake device 10 illustrated in FIGURES 1, 2 and 3 for purposes of disclosure employs forward and reverse brake shoes both of which are actuated by a double-acting wheel cylinder 20 having opposed actuator and adjustable means of substantially identical construction, except that the adjustable struts 46, 46a are reversely threaded so as to rotate in the same direction. The automatic adjustor devices 22 arranged for cooperable engagement with the adjustment starwheel members 40, 40a are also substantially identical to each other except for reverse or opposite configuration so as to cooperate with the left-hand and right-hand adjustment means 39, 39a. Accordingly, only the right-hand adjustor device 22 will be described in detail and similar numerals will be given to corresponding parts of the left-hand adjustor device 22a.

According to the present invention the brake shoes 14, 14a are automatically and individually adjusted relative to the brake drum 16 by the automatic adjustor devices 22 in response to displacement movement of the brake shoes in excess of a predetermined amount to thereby compensate for wear of the linings 15, 15a as a result of frictional engagement with the drum. The automatic adjustor device 22 (described with reference to the right-hand portion of FIGURES 2 and 3) comprises a bell crank which includes an adjustor body or main base plate 49 having a mounting aperture or swivel opening 50 in the central portion thereof, a crank arm or pawl 51 forming a control lever and a crank foot or flange detent 52 forming a follower portion. The bell crank adjustor 22 is mounted adjacent to the starwheel 40 on a flat bearing surface 53 of the wheel cylinder housing 24, which is a fixed or stationary part of the brake 10, by a pivot pin assembly 54 having a threaded portion 55 secured to the housing, a shank portion 56 received through the opening 50 and a flange or head portion 57 larger than the opening 50 to prevent displacement of the adjustor body 49 therefrom. The bearing surface 53 is in a plane substantially normal to the radial plane of the flange 42 and which intersects the starwheel 40 on a chord line spaced from and parallel with a tangential line to the notched periphery 44 of the starwheel, FIGURE 3. The adjustor opening 50 is sized substantially larger than the shank 56 of the pin assembly 54 and the head 57 is spaced from the bearing surface 53 a predetermined amount to provide a swivel or wobble type action of the adjustor 22 on the pin assembly 54.

As shown in the drawings, the bell crank adjustor 22 is preferably stamped or punched as an integral unit, the crank arm 51 being positioned in a plane offset below the base plate 49 by a connecting portion 58 and projecting laterally from one end of the base plate 49 at an acute angle. The crank foot 52 is formed on the other end of the elongated, poly-sided base plate 49 and extends laterally outwardly and downwardly therefrom. The crank arm 51 has a driving edge or pawl surface 59 in spaced opposed relation with the crank foot 52, and the crank foot has a curving outer follower or cam surface 60 and a lower support edge 61. The lower surface of the base plate 49 forms an abutment or swivel limiting stop 62 opposite the crank foot, and the outer marginal edge of the base plate 49 opposite the crank arm 51 forms another abutment or swivel limiting stop 63.

The adjustor device 22 also includes a spring 64 having one end connected at the crank arm end of the base plate 49, at opening 65, and being engaged with a spring retaining boss or flange 66 of the wheel cylinder housing 24 to exert a compound force on the adjustor device 22 biasing the curved follower surface 61 of the crank foot 52 axially into abutment with the radial shoulder 43 of the starwheel 40 and biasing the crank arm 51 radially against the teeth 44 of the star wheel. As shown in FIGURES 2 and 3, the spring 64 is positioned under the housing boss 66 and extends angularly outwardly and downwardly therefrom and has its opposite ends engaged with both adjustors 22 for the adjustment means 39, 39a at both ends of the double-acting wheel cylinder 20.

Referring to FIGURES 2–5, when the adjustor 22 is assembled ready for operation, the bell crank body 49 is canted or angularly disposed with respect to the bearing surface 53 and the crank arm 51 extending in an axial direction and being engaged on the teeth 44 of the starwheel and the crank foot 52 being disposed against the radial surface of the starwheel flange 42. As will become more apparent the dual control function of the crank arm 51 is to provide driving engagement of the pawl edge 59 with a tooth 44 of the starwheel 40 to effect rotation thereof and adjustment of the retracted brake shoe position to compensate for wear of the lining 15 and to restrain or retard starwheel rotation during normal operation. Acordingly, the axial length of the crank arm 51 is greater than the displacement movement of the starwheel away from the housing 24 to thereby maintain operative engagement of the pawl edge 59 with the starwheel teeth 44. The dual function of the crank foot 52 is to cooperate with the spring 64 in effecting the rotation and swivel action of the adjustor 22 during normal and adjusting operation of the device and to support the adjustor in a released or displaced inoperative position during manual adjusting of the starwheel 40.

As shown in FIGURE 4, the adjustor 22 is mounted for rotation on a pivot axis A—A of the pin assembly 54 and is adapted for limited pivotal or swivel movement around the axes B—B and C—C lying in a plane parallel with the bearing surface 53. The bell crank adjustor 22 is biased by the extension spring 64 which, in the embodiment shown in FIGURES 2 and 3, is angularly disposed on a line as the resultant of, or producing two vector force components $S_1$ and $S_2$ acting on the adjustor. Force $S_1$ rotates the adjustor about axis A—A to maintain the crank foot surface 60 engaged with the starwheel surface 43, the moments of forces $S_1$ and its reaction force $F_2$ on the crank foot 52 being equal. Force $S_2$ holds the crank arm 51 on the notched periphery of the starwheel 40 thereby developing a reaction force P and an interface friction force $F_1$ between the curved surface 60 and the radial surface 43. Moments of forces $S_2$, P and $F_1$ about axes B—B and C—C are in equilibrium. It will be seen that the reaction force $F_2$ is exerted below the plane B—B and C—C of the base plate 49 so that forces $S_2$ and $F_2$ are additive to maintain the crank arm 51 engaged with the starwheel.

In the following description of the operation of the friction device 10 and automatic adjustors 22 it will be assumed that only the friction lining 15 is sufficiently worn to require adjustment of the brake shoe 14 and that the parts of the brake and adjustors are in retracted position as shown in FIGURES 2 and 3. Fluid pressure transmitted to the chamber 35 of the wheel cylinder 20 through the inlet 36 from a source of fluid pressure, such as a master cylinder (not shown), acts on the effective areas of the sealing cups 31, 31a to create an actuating force. This actuating force displaces the sealing cups 31, 31a, the actuators 29, 29a and the adjustable mechanisms 39, 39a outwardly in the bore 28 so that the brake shoes 14, 14a are radially displaced against the compressive force of the return spring 21 to urge the linings 15, 15a into frictional braking engagement with the relatively rotatable drum 16. During the displacement movement of the adjustable means with the brake shoe 14, 14a the starwheel 40, 40a moves axially on axis O—O, FIGURE 4, and the spring force $S_1$ pivots each bell crank adjustor 22 about pivot axis A—A maintaining contact of the follower surface 60 of the crank foot 52 with the starwheel surfaces 43, 43a. During brake actuation the forces $F_1$ and $F_2$ will be reduced in magnitude, but remain proportional. As previously noted, the bearing surface 53 of the wheel cylinder is below the starwheel periphery and the adjustor 22 is canted angularly upwardly relative to the bearing surface 53 when the starwheel 40 is in retracted position abutting the end of the wheel cylinder housing 24. The crank arm 51 engages the starwheel laterally of a plane through the starwheel axis and normal to the plane of the adjustor. As the starwheels 40, 40a are displaced away from the housing 24 by the actuator pistons 29, 29a, the angularity of the adjustors 22 relative to the bearing surfaces will decrease. Since wear of lining 15 requires adjustment of the brake shoe 14, as aforesaid, the displacement movement thereof exceeds the predetermined amount necessary to operate the adjustment means. Accordingly, the adjustor 22 associated with the starwheel 40 pivots on its axis A—A far enough that the crank arm 51 is moved behind the trailing tooth 44 on the notched starwheel periphery thereby reducing the force P, but the crank arm 51 is maintained engaged with the starwheel by the forces $S_2$ and $F_2$ so that the adjustor is "cocked" preparatory for adjustment. At this point the adjustor 22 is substantialy parallel with the bearing surface 53. it should be noted that the abutment 63 of the adjustor has moved toward a cooperating abutment shoulder 67 on the housing boss 66, but that during normal adjusting operation only one notch will be picked up by the crank arm 51 and that the adjustor 22 will ordinarily rotate or overtravel into abutting engagement with the abutment 67 only following initial installation when there is excessive displacement between the brake shoes and drum.

When the brake 10 is de-energized, the fluid pressure in the chamber 35 is exhausted, eliminating the actuating force, and the compressive force of the shoe retraction spring 21 moves the shoes 14, 14a to their retracted positions. This retractile shoe movement acts on the struts 46, 46a, the starwheel members 40, 40a and the actuator pistons 29, 29a to move them inwardly in the bore 28 to their original positions. During the retraction of the starwheels on axis O—O, the magnitude of reaction force $F_2$ exerted by each starwheel on the follower surface 60 of the associated actuator crank foot 52 is increased by the retraction spring force to drive the actuator back around its axis A—A. Since the force $F_2$ is below the plane of the axes B—B and C—C, the actuator 22 is positively cammed into a tilted or canted position around its axis B—B wherein the base plate 49 rides up on the shank 56 of the pin assembly 54 and the crank arm 51 is held radially inwardly against the starwheel periphery. Accordingly, during retraction of the brake shoes 14, 14a and the adjustable means, the actuators 22 swivel on axes A—A and B—B to maintain the pawl edge 59 of the control arm 51 in positive driving engagement with the next notch 44 on starwheel 40, rotating the starwheel and threadedly extending the strut 46 axially outwardly to adjust the brake shoe 14 to its predetermined retracted position to maintain the displacement between the lining 15 and the brake drum 16 substantially constant. As the starwheel 40 rotates and moves axially into abutment with the end of the housing 24, the trailing tooth behind the crank foot 51 will rotate into contact with the lower surface of the crank foot to increase the force P resulting in the canting of the adjustor 22 to its angular retracted position and re-establishing the equilibrium of forces.

Continued wear of the lining 15 will result in further adjustment of the brake shoe 14 by the automatic adjustor device 22 in the same manner. The cooperation of component parts and the operation of the adjustor device 22 in adjusting the retracted position of brake shoe 14a to compensate for wear of the lining 15a is identical with that described hereinbefore. During normal operation of the friction device 10 when no adjustment is required, the bell crank adjustors 22 pivot in response to axial movement of the starwheel members 40, 40a, but the crank arms 51 are not swung a sufficient degree to engage the next tooth 44 or 44a of the starwheels 40, 40a so that the control arms 51 restrain rotation of the starwheels in either direction and maintain the adjusted position thereof.

The brake may be manually adjusted and, for this purpose, access openings 70, 70a are provided in the backing plate 11, FIGURE 3, substantially in alignment with the notched periphery of the starwheel members 40, 40a. These openings are normally closed by flexible closure members 71, 71a to prevent entry of foreign material. Removal of the closure members permits the manual insertion of an adjusting tool (not shown) through the openings 70, 70a into engagement with the notches 44, 44a of the starwheel members 40, 40a. When it is desired to manually adjust the adjustable means 39 or 39a to retract or unadjust the strut members to a retracted position of the brake shoes 14, 14a relative to the wheel cylinder housing 24, the adjusting tool is first applied to rotatably drive the starwheel 40, 40a in an adjusting direction. With reference to FIGURES 4 and 5, it will be noted that the spring 64 is engaged with the adjustor 22 adjacent the outer end of the base plate 49 or crank control lever 51 so that the force $S_2$ is outwardly of the reaction force P relative to the swivel axes A—A, B—B and C—C. Therefore, rotation of the starwheel 40 in adjusting direction drives the trailing notch 44 of the starwheel 40 against the lower surface of the crank arm 51 to increase the force P. This increase of force upsets the equilibrium of forces, including the spring force $S_2$, frictional force $F_1$ and reaction force $F_2$, acting on the adjustor 22 about axes B—B and C—C and disengages the crank arm 51 from the notched periphery of the starwheel whereby spring force $S_1$ rotates the adjustor 22 about pivot axis A—A. In other words, rotation of the starwheel 40 to increase the force P acts on the crank arm to tilt the adjustor 22 around both axes B—B and C—C due to the moment created by the lifting action, but pivoting of the base plate 49 around axis C—C is limited by contact between abutment surface 62 of the adjustor and the bearing surface 53 thereby developing force $R_2$, FIGURE 5. Therefore, the force P is translated to pivotal movement of the adjustor 22 around axis B—B so that the crank arm 51 is disengaged from the starwheel teeth 44 and the crank foot is radially displaced from contact with the starwheel surface 43. The spring force $S_1$ thus pivots the adjustor 22 around axis A—A to engage the abutment shoulders 63 and 67 and establish reaction force $R_1$. In this position the crank foot 52 is disposed over the periphery of the starwheel 40 and the support edge 61 rests on two or more teeth 44 and develops a force F₃ holding the adjustor 22 in this outer tilted postion with the crank lever 51 spaced from the teeth 44 of the starwheel 40. The starwheel 40 now can be rotated easily in the opposite direction to unadjust the brake shoe 14. It will thus be seen that the adjustor 22 can be displaced to an inoperative position with the crank arm 51 disengaged from the starwheel by simple manipulation of the starwheel in a brake extending adjusting direction.

The adjustor 22 is restored to normal operating position, FIGURE 4, by a normal brake application moving the starwheel 40 on its axis 0—0 from under the crank foot 52 and re-engaging the crank arm 51 with the notched periphery of the starwheel.

Referring now to FIGURES 6 and 7, a modified embodiment of the adjustor mechanism 122 is shown in association with a wedge operated friction device 110 of the type more fully disclosed in copending patent application of Wallace and McElwrath, Ser. No. 332,390, filed Dec. 23, 1963, and having a common assignee. Briefly, the friction device 110 may be provided with double-acting wheel cylinders, but as disclosed, utilizes a pair of opposed actuator motors or wheel cylinders 120 each being secured to a backing plate 111 and actuating the opposed pairs of adjacent ends 119 of brake shoes 114 outwardly for frictional engagement with a brake drum (not shown). In other words, the wheel cylinder 120 shown in FIGURES 6 and 7 is one of a pair of substantially identical wheel cylinders engaging and actuating both ends of the brake shoes 114 and 114a. Therefore, only the wheel cylinder 120 in FIGURES 6 and 7 will now be described.

The wheel cylinder 120 has a housing 124 with a bore 128 intersected by a cross-bore 123, and a pair of pistons or actutaors 129 are slidable in the bore 128 and having opposed inclined end surfaces 129b. A self-contained cage and roller assembly 135 having a U-shaped configuration is disposed in the cross-bore 123 for reciprocal movement transversely of the bore 128 for displacing the pistons 129 outwardly for actuating friction device 110. One of the pistons 129 engages one end of a link 137 having its other end operatively connected with a brake shoe end (not shown) and the other piston 129 is formed with adjustment means 139 including a first or starwheel memberf 140 and a second or strut member 146. These adjustable means may be similar to the adjustable means 39, 39a previously described or may conform to the configuration disclosed in said Wallace and McElwrath application.

Referring to FIGURE 6, the adjustor device 122 disclosed is similar in configuration, operation and interrelationship to the adjustment means 139. However, it will be seen that the adjustor 122 is biased by a torsion spring 164 having one end engaged with the adjustor body 149 and the other end engaged with the housing 124. The spring 164 is coiled around a pin assembly 154 between fixed spaced head or flange means 157 to prevent the spring from engaging the adjustor 122 per se. Accordingly, it will be apparent that the spring 164 exerts a compound force on the adjustor having both the S₁ and S₂ force components to normally maintain the crank arm 151 engaged with the notched periphery 144 of the starwheel 140 for controlling rotation thereof and the crank foot 152 engaged with the radial surface 143 of the starwheel.

The other structural features and operation of the adjustor device 122 are identical with the adjustor 22 previously described.

It will be apparent to all skilled in the art that the adjusting mechanisms or adjustors 22 and 122 are not necessarily limited for use with the particular types or geometric configurations of the friction devices 10 and 110 shown and described herein only for purposes of illustration. Further, the wheel cylinders 20 and 120 are shown only for purposes of illustration in conjunction with the adjustors 22 and 122, and it will also be apparent that other actuators and other adjustable means may be employed to impart the actuating force for energizing the friction device and to adjustably determine the retracted position of the friction members. From the foregoing it will be clear that all changes and modifications of the disclosed forms of the invention that will be readily apparent to those skilled in the art are contemplated as within the scope of the invention, and the invention is only limited by the claims which follow.

The embodiments of the invention in which an exclusive property or privilege is claimed are defined as follows:

1. An adjustor mechanism for use with rotatable friction member adjustable means in a friction device, said adjustable means having a notched peripheral surface interconnected with a substantially radially extending follower surface, comprising lever means pivotally mounted adjacent said adjustable means and having spaced driving and follower means thereon normally engaged with said peripheral and follower surfaces, respectively, at spaced locations generally chordwise of said adjustable means, and spring means connected with said lever means and exerting a force having a moment urging said driving means into engagement with said peripheral surface and urging said follower means on said follower surface toward said peripheral surface.

2. The adjustor mechanism according to claim 1, wherein said adjustable means is manually rotatable to exert another force on said lever means having a moment additive to the moment of said first force to urge said follower means toward said peripheral surface and a position disengaged from said follower surface.

3. The adjustor mechanism according to claim 1, wherein said spring means also exerts another force on said lever means having a moment urging said follower means and drive means in a direction toward engagement with said follower surface and toward engagement with a successive notch on said peripheral surface, respectively.

4. The adjustor mechanism according to claim 3, wherein said adjustable means is manually rotatable to exert a disabling force on said lever means having a moment opposed to and greater than that of said other force and additive to that of said first named force to displace said lever means and move said follower means toward a position disengaged from said follower surface, the moment of said other force being effective upon the disengagement of said follower means from said follower surface to pivotally displace said lever means urging said follower means toward engagement with said peripheral surface and urging said driving means toward a position out of driving engagement with said peripheral surface.

5. The adjustor mechanism according to claim 4, comprising abutment means on said friction device for engagement with a portion of said lever means to limit displacement movement of said lever means in response to the disabling force.

6. The adjustor mechanism according to claim 4, comprising an abutment surface on said friction device, said lever means having a portion thereon movable into engagement with said abutment surface to define therewith a pivot point for said lever means when said driving and follower means are respectively urged into and out of engagement with said peripheral surface by the moment of said other force.

7. The adjustor mechanism according to claim 3, comprising pivot pin means on said friction device, aperture means in said lever means received on said pivot pin means and defining therewith a connection for universal pivotal movement of said lever means, said spring means including opposed bearing arms connected with said driving means and a portion of said friction device, and a spring coil portion between said arms received on said pivot pin means, and means on said pivot pin means spacing said spring coil portion from said lever means.

8. An adjustor mechanism for rotatable friction member adjustable means having a notched peripheral surface interconnected with a follower surface, comprising lever means pivotally mounted adjacent to said adjustable means and having spaced driving and follower means thereon for driving and following engagement with said peripheral and follower surfaces, respectively, and spring means connected with said lever means and exerting a force thereon having moments about separate axes urging said driving means against said peripheral surface and urging said follower means against said follower surface and in a direction thereon toward said peripheral surface, said adjustable means being manually rotatable to exert a disabling force on said driving means having a moment in opposition to and greater than one of the moments of said first named force and additive to another of the moments of said first named force to displace said lever means and move said follower means toward said peripheral surface to a position disengaged from said follower surface, and said one moment of said first named force being effective when said follower means is disengaged from said follower surface to further displace said lever means and move said driving means toward a disabled position out of driving engagement with said peripheral surface.

9. An adjustor mechanism for rotatable friction member adjustable means having a notched peripheral surface interconnected with a follower surface, comprising lever means including pivoting means mounted for universal pivotal movement adjacent to said adjustable means, and driving and follower means for engagement with said peripheral and follower surfaces, respectively, and spring means connected with said lever means at a point remote from said pivoting means for normally maintaining said lever means in equilibrium with respect to said adjustable means, said spring means exerting a force component on said lever means having a first moment acting about a first axis urging said follower means into engagement with said follower surface to establish a first reactive force and also establish a second reactive force acting on said pivoting means, the sum of said first moment and its first and second reactive forces about the first axis being substantially zero to effect equilibrium of said lever means about said first axis, said spring means also exerting another force component on said lever means having a second moment acting about a second axis urging said driving means into engagement with a notch on said peripheral surface to establish a third reactive force and also to establish a fourth reactive force acting on said pivoting means, the sum of said second moment and its third and fourth reactive forces about said second axis being substantially zero to effect equilibrium of said lever means about said second axis, said second moment tending to urge said follower means on said follower surface toward said peripheral surface upon the upset of the equilibrium of the second moment and its third and fourth reactive forces about said second axis.

10. The adjustor mechanism according to claim 9, wherein said adjustable means is manually rotatable to move a successive notch on said peripheral surface into engagement with said driving means to exert a disabling force having a third moment acting about a third axis, said third moment being greater than and opposed to said first moment and additive to said second moment to upset the equilibrium of said lever means about the first and second axes and displace said lever means about the third axis to a position disengaging said follower means from follower surface, said third moment being eliminated upon the disengagement of said follower means from said follower surface and said first moment being thereafter effective to displace said lever means about said first axis to move said driving means toward a position out of driving engagement with said peripheral surface and do move said follower means toward engagement with said peripheral surface.

11. An adjustor mechanism for rotatable friction member adjustable means having a notched peripheral surface interconnected with a substantially radially extending follower surface, comprising lever means mounted for universal pivotal movement adjacent to said adjustable means and having spaced driving and follower means for respective engagement with a notch on said peripheral surface and said follower surface, and spring means connected with said lever means extending thereon a force component having a moment urging said follower means into following engagement with said follower surface and urging said driving means toward a position for driving engagement with a successive notch on said peripheral surface and also exerting on said lever means another force component having a moment urging said follower means on said follower surface toward said peripheral surface and urging said driving means into engagement with said notch on said peripheral surface, said adjustable means being manually rotatable to move a successive notch on said peripheral surface into engagement with said driving means thereby exerting a disabling force on said lever means having a moment opposed to and greater than that of said first named force and additive to that of said other force to displace said lever means and move said follower means toward a position disengaged from said follower surface, and said first named force component being thereafter effective to displace said lever means to a disabled position urging said follower means into engagement with said peripheral surface and urging said driving means out of driving engagement with said peripheral surface.

12. In a friction device having a friction member displaceably movable toward a displaced position for frictional engagement with a coacting member, return spring means urging said friction member toward a retracted position, and rotatable adjustable means defining the retracted position of said friction member and movable therewith including a notched peripheral surface and an interconnected follower surface, an actuator mechanism for said adjustable means comprising a lever mounted on a portion of said friction device adjacent to said adjustable means for universal pivotal movement about first and second generally normal axes defined in a plane and a third axes substantially normal to said plane and said first and second axes, spaced driving and follower means on said lever means for driving and following engagement with said peripheral and follower surfaces, spring means connected with said lever means at a point remote from said friction device portion and exerting a first force component on said lever means having a moment acting about said first axis urging said driving means into engagement with said peripheral surface and urging said follower means on said follower surface toward said peripheral surface, said spring means also exerting a second force component on said lever means having a moment acting about said second axis urging said follower means into following engagement with said follower surface and urging said driving means toward a position for driving engagement with a successive notch on said peripheral surface, the following engagement of said follower means with said follower surface upon-displacement movement of said adjustable means with said friction member in excess of a predetermined amount effecting pivotal movement of said lever means in one direction about said first and second axes to move said driving means to its position in driving engagement with said successive notch on said peripheral surface and the following engagement of said follower means with said follower surface also effecting pivotal movement of said lever means about said first and second axes in an opposite direction upon the retractile movement of said adjustable means and friction member in response to the compressive force of said return spring means, said driving means being concertedly movable with said lever means in the other direction to drive said successive notch and rotate said adjustable means in an adjusting direction to redefine the retracted position of said friction member, said rotatable means also being manually rotatable in the adjusting direction to move another successive notch on said peripheral surface into engagement with said driving means exerting another force thereon having a moment acting about said third axis in opposition to and greater than that of said second force component and additive to that of said first force component to displace said lever about said first, second and third axes and move said follower means toward a position disengaged from said follower surface, and said other force being eliminated upon the disengagement of said follower means from said follower surface and said second force component being subsequently effective to displace said lever means about said second axis to move said follower means into engagement with said peripheral surface and to move said driving means out of driving engagement with said peripheral surface.

13. In the friction device according to claim 12, comprising an abutment surface on said friction device, said lever means having a portion thereon movable into engagement with said abutment surface upon the subsequent displacement of said lever means in response to said second force component, the engagement between said abutment surface and lever means portion defining a pivotal point for said lever means when said follower means is engaged with said peripheral surface and said driving means is disengaged from said peripheral surface.

References Cited

UNITED STATES PATENTS 3,209,866   10/1965   Ullrich _____ 188—196 X

DUANE A. REGER, *Primary Examiner.*